INVENTOR.
RAY J. LANINGHAM
BY
HIS ATTY.

July 1, 1952  R. J. LANINGHAM  2,601,716
PRECISION TURNING, THREADING, AND CENTERING LATHE ATTACHMENT
Filed Nov. 9, 1949  3 Sheets-Sheet 3
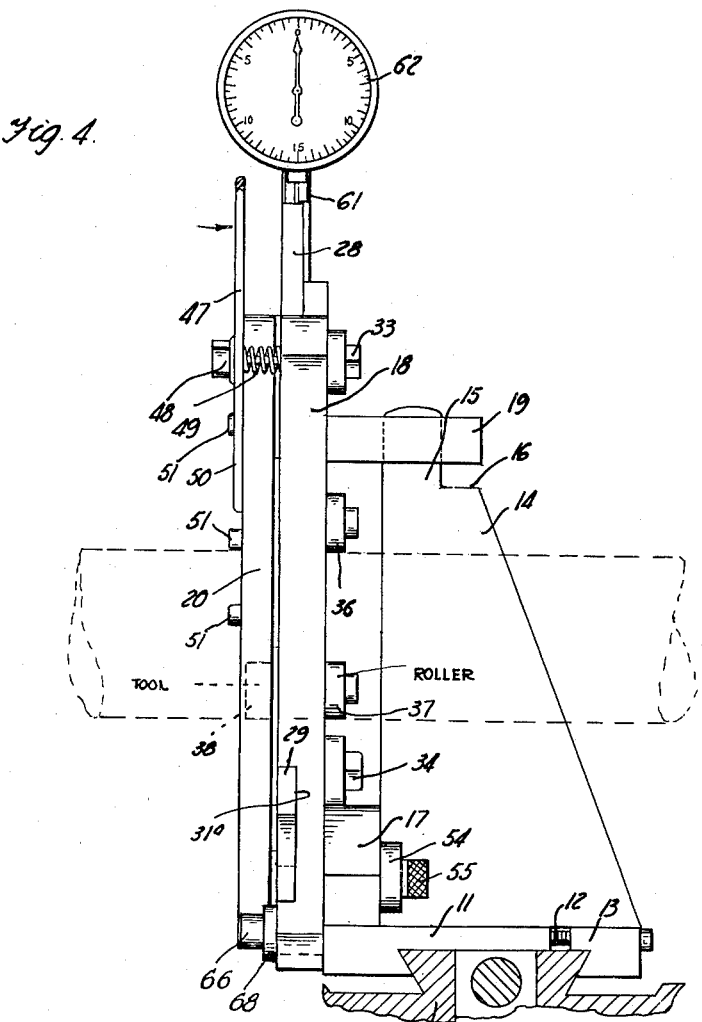
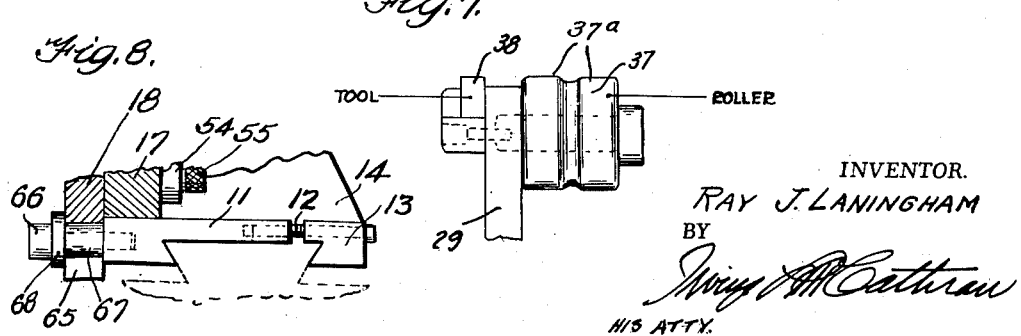
INVENTOR.
RAY J. LANINGHAM
BY
HIS ATTY.

Patented July 1, 1952

2,601,716

UNITED STATES PATENT OFFICE 2,601,716

PRECISION TURNING, THREADING, AND CENTERING LATHE ATTACHMENT

Ray J. Laningham, Morganton, N. C.

Application November 9, 1949, Serial No. 126,420

6 Claims. (Cl. 29—27)

This invention relates to a precision turning, threading and centering lathe attachment, and has for one of its objects the production of a lathe attachment which will assure a uniform diameter upon the work from one end to the other regardless of the length of the work, and regardless of how badly worn or out of line the lathe may be.

A further object of this invention is the production of a lathe attachment which will roll the work in trailing sequence with the cutting tool so as to remove the cutting tool marks from the surface of the work at the same time the cut is taken.

Other objects and advantages of this invention will appear throughout the following specification and claims.

In the drawings:

Figure 4 is a side elevational view of the lathe attachment;

Figure 5 is an enlarged fragmentary vertical sectional view taken on line 5—5 of Figure 1;

Figure 6 is an enlarged fragmentary vertical sectional view taken on line 6—6 of Figure 1;

Figure 7 is a side elevational view of the inner end of the tool and roller supporting radially mounted slide;

Figure 8 is a vertical fragmentary sectional view taken on line 8—8 of Figure 1;

Figure 9 is a fragmentary front elevational view showing the notches which are formed in the lower corners of the disc supporting plate, to permit floating action of the disc supporting plate.

Figure 1:
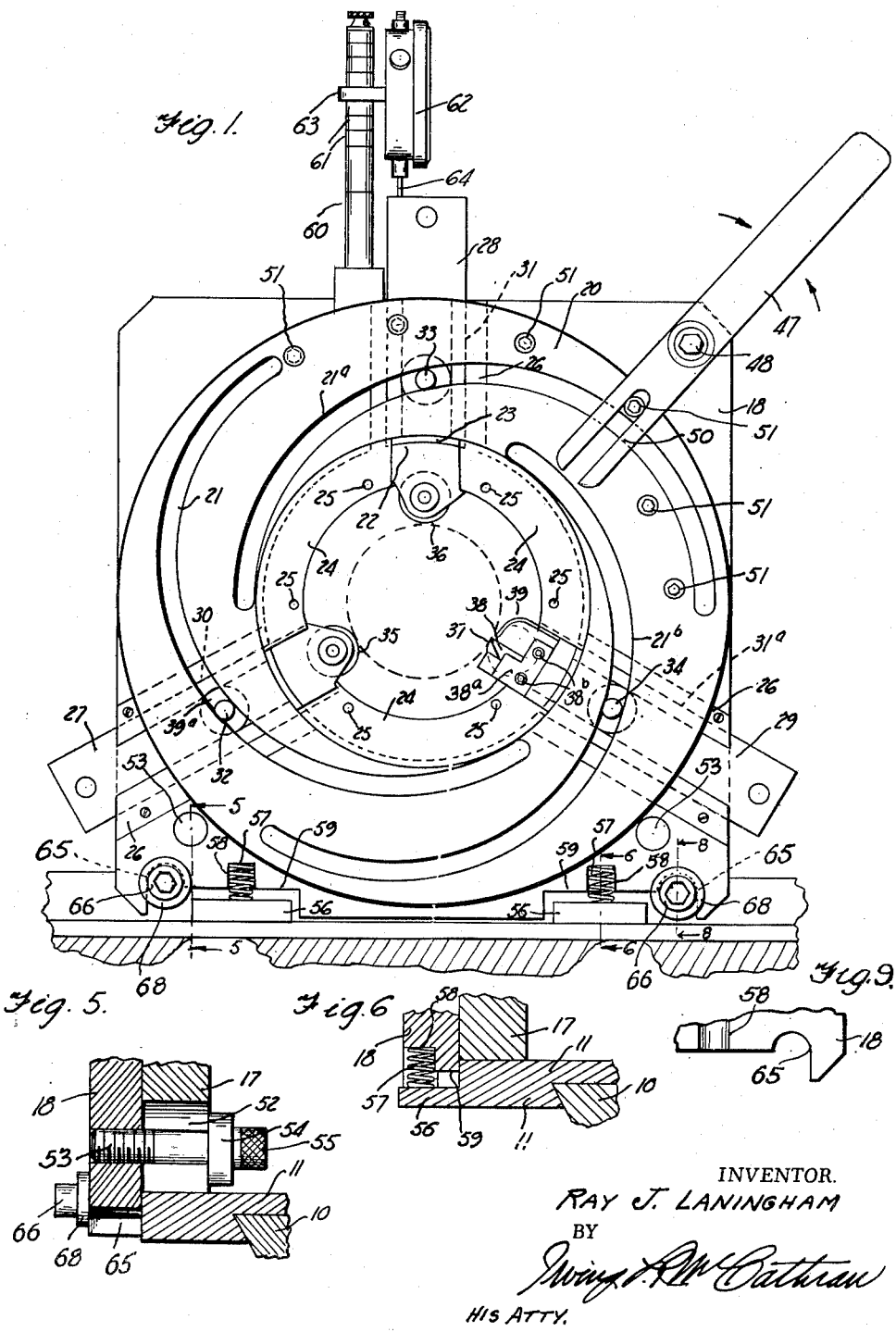
Figure 1 is a front elevational view of the lathe attachment.

By referring to the drawings in detail, it will be seen that 10 designates the lathe saddle upon which the lathe attachment supports 11 are slidably mounted. The supports 11 are clamped upon the saddle 10 in the conventional manner by means of suitable clamping screws 12 which actuate clamping jaws 13. The supports 11 are provided with a plurality of laterally spaced upstanding bracing members 14 having protruding terminal ends 15 reduced in size relative to the bracing members 14 defining shoulders 16 near the terminals 15. The supports 11 are connected by a transversely extending bottom bar 17 which preferably is shaped for convenient assembly and operation of the attachment and is arranged in front of the upstanding bracing members 14.

A disc supporting plate 18 extends vertically relative to the supports 11 and carries upon its rear face near its upper end a spacer 19 which is suitably slotted to receive the upper terminals 15 of the bracing members 14 and thereby brace the upper end of the supporting plate 18. The terminals 15 are snugly and vertically slidably fitted in the spacer to hold the supporting plate in vertical alignment with respect to the bracing members 14 while at the same time permitting the supporting plate 18 to be vertically adjusted with respect to the bracing members 14.

A circular adjusting disc 20 is fixed to the front face of the supporting plate 18 and this disc 20 is provided with a plurality of spaced cam slots 21, 21ª and 21ᵇ, preferably three in number and arranged eccentrically around a central work receiving opening 22. The disc 20 is preferably provided with an insert ledge 23 at the periphery of the opening 22 for receiving the retaining segmental plates 24 which extend flush with the outer face of the disc 20 and rest upon the inset ledge 23. These plates 24 are anchored to the supporting plate 18 by means of suitable screws or other anchoring means 25. These segmental plates 24 firmly hold the disc 20 against the gibs 26 which retain the roller and tool supporting slides 27, 28 and 29 while at the same time permitting the disc 20 to rotate for manual adjustment by an operator.

The supporting plate 18 is provided with radially extending channels 30, 31 and 31ª, in which channels the slides 27, 28 and 29 respectively, are slidably mounted. The gibs 26 firmly retain these slides within the channels against displacement while permitting free sliding movement within the channels. The slide 27 is provided with a pin 32 and the slides 28 and 29 are provided with pins 33 and 34 respectively. These pins 32, 33 and 34 fit in the respective cam slots 21, 21ª and 21ᵇ of the adjusting disc 20. A work engaging roller 35 is journalled to one side of the inner end of the slide 27, and a work engaging roller 36 is journalled to one side of the inner end of the slide 28. A work engaging roller 37 is journalled to one side of the inner end of the slide 29. The slide 29 carries a conventional cutting tool 38 and chip shield 39 upon the side opposite the roller 37 and in advance of the roller 37 in the normal line of travel of the cutting tool. All of the rollers 35, 36 and 37 are arranged in the same vertical plane and rearwardly of the vertical plane in which the tool 38 is mounted, so that all of the rollers will be in trailing relation relative to the tool 38 and have a rolling contact with the surface of the work in trailing relation with and following the cutting tool. The rollers 35, 36 and 37 are inset toward the center of the work slightly closer than the cutting tool 38, about ½ thousandth of an inch so as to provide sufficient pressure to not only hold the work properly centered, but also to press out, remove or obliterate any tool markings which may have been left upon the surface of the work. This is made possible because of the trailing sequence of the rollers and pressure of the rollers upon the surface of the work and the fact that the rollers are mounted in the same vertical plane with respect to each other upon the rear side of the slides 27, 28 and 29 while the cutting tool 38 is mounted upon the forward face of the slide 29 in advance of the rollers.

The cutting tool or tool bit 38 is secured to the forward face of the slide 29 by means of a clamping plate 38ª, shown in Figure 1. The plate 38ª is secured in position upon the slide 29 by means of suitable bolts 38ᵇ.

The pin 32 is made with a shoulder which fits in a counterbore in the slide 27, and also carries a suitable washer 40 which engages the rear face of the supporting plate 18. A nut 41 is threaded upon the rear end of the pin 32 to retain the slide 27 and pieces attached thereto in an adjusted position. The pin 32 is slidable in the radially extending slot 42 to facilitate radial adjustment of the slide 27. The pins 33 and 34 constitute a similar assembly to that described relative to the pin 32, and these pins 33 and 34 are slidably mounted in the radially extending slots 43 and 44 respectively. Therefore, it is thought unnecessary to duplicate the description of the pins 33 and 34, and their associated parts. It should be noted that the supporting plate 18 is provided with notches 45 which extend radially of the work receiving opening 46 to provide room for radial adjustment of the slides 27, 28 and 29, and the rollers carried thereby.

An adjusting or actuating lever 47 is pivotally mounted upon a journal 48, and the lever is yieldably and loosely supported upon the journal 48 by means of a coil spring 49 to permit the lever to be yieldably swung toward or away from the outer face of the disc 20 by the operator. The lever 47 is provided with a fork-shaped or slotted end 50 which is adapted to be progressively fitted over the lugs 51 which are arranged near the periphery of the disc 20 for rotating the disc 20. The lever 47 is moved to a position to engage one of the lugs 51 and is swung in the direction of one of the arrows shown in Figure 1, to rotate the disc 20 in a desired direction. If the disc is not rotated sufficiently, the outer end of the lever 47 is swung rearwardly in the direction of the arrow shown in Figure 4 to lift the forked end of the lever from the engaged lug and the lever is swung to a position to engage the next lug, and the forked end of the lever is then dropped over the selected lug. Then by swinging the lever 47 laterally in the selected direction, the disc may be further rotated to adjust the slides 27, 28 and 29. The lever 47 is operated in a step-by-step manner to accomplish the desired rotation of the disc 20. Since the pins 32, 33 and 34 fit into the cam slots 21, 21ª, and 21ᵇ, it should be noted that by rotating the disc 20 in the desired direction, the slides 27, 28 and 29 will be simultaneously adjusted and uniformly moved to a selected position radially of the center of the work receiving opening of the device. In this manner the rollers and the tool may be selectively and uniformly adjusted simultaneously with respect to the work to obtain a uniform diameter throughout the length of cut.

The bottom bar 17 of the supports 11 is provided at each end with a notch 52 to provide clearance for the bolts 53 so that the supporting plate 18 and pieces attached thereto may be moved to either side up and down in order that the plate 18 may be adjusted to a working or centered position. A washer 54 is carried by each bolt 53 to overlap the side of each notch 52 and to abut the head 55 of each bolt to lock the plate 18 in a working or centered position with respect to the supports 11. This structure is shown in detail in Figure 5. Each of the supports 11 is provided with a forwardly extending tongue 56 which tongues support coil springs 57.

It should be noted that by moving the carriage of the lathe back toward the tail-stock, the rollers 35, 36 and 37 will surround the tail-stock center. The tail-stock center support is locked in a working position, while the plate 18 and pieces attached thereto constitute a floating unit. Then by moving the lever 47 so that the slides 27, 28 and 29 force the rollers 32, 33 and 34 against the tail-stock support, the plate 18 will automatically be located in a correctly centered or working position. While pressure still is maintained, the bolts 53 which lock the plate 18 to the bar 17 are tightened. The next step is to move the lever 47 so that the rollers are moved away from the tail-stock center support and toward the head-stock so that the rollers and tool bit is located between the end of the tail-stock support and the end of the work piece. Then the attachment should be adjusted for the desired size or work. The cut is started while the plate 18 is locked to the bar 17, and this is continued in this manner until the rollers 35, 36 and 37 contact the work piece. The bolts 53 are then loosened thereby causing the springs 57 to support the plate 18, and the elements carried thereby, as a floating unit, since these springs 57 rest upon the tongues 56 and are fitted in the sockets 58 formed in the bottom edge of the plate 18. This arrangement will cause the cutting tool 38, etc., attached to the plate 18 to be guided by the turned and rolled surface of the work itself instead of following the guides of the lathe which may be worn or otherwise out of line. This structure described above will maintain a uniform diameter, free of tool marks, since the path of the tool is followed by the rollers as the cut is being made throughout the entire length of the work piece. It should particularly be noted that in order to turn a piece of work and maintain the exact size from end to end, the tool must be held at the same distance from the center of the work at all times. This is accomplished by the herein described structure because of the floating unit which is made possible by the yieldable supporting springs 57. This structure by being a floating unit, may move downwardly to either side as well as vertically to accomplish the desired results.

Figure 2:
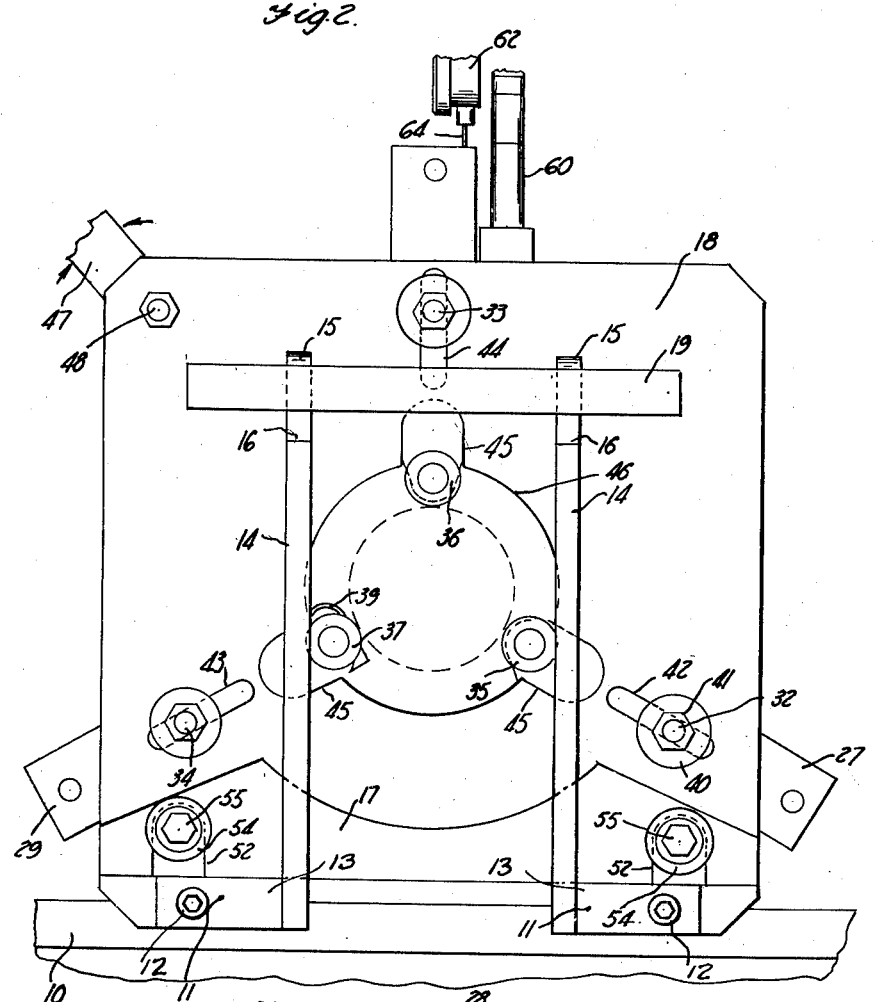
Figure 2 is a rear elevational view thereof.
Figure 3:
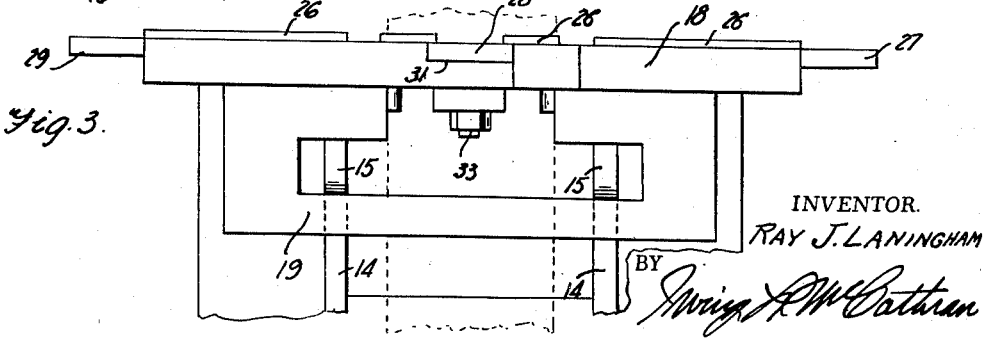
Figure 3 is a fragmentary top plan view with certain portions broken away, and the disc and operating lever removed.

As shown in Figures 1, 2 and 4, it will be noted that a standard 60 is carried by the top of the plate 18 and carries a plurality of removable spacers 61 upon a suitable stem. An indicator 62 of the conventional or a suitable type such as the "Federal Dial Indicator," is selectively placed upon the standard 60 and anchored between selected spacers 61 by fitting the anchoring eye 63 therebetween. The indicator 62 is provided with a depending stem 64 which rests upon the upper end of the slide 28 to indicate to the operator the position of the slide 28 and its movement, and in fact the position of all of the slides, since they all move and are adjusted simultaneously. The indicator 62 may be set so as to indicate the movement inwardly as well as outwardly, which will enable an operator to set the tool to cut the desired size before the tool touches the work piece. A vernier properly fitted to the plate 18 and to the slide 28 and with a magnifying glass properly fitted so as to facilitate the reading of the vernier, may be used within the scope of the invention. The above mentioned means may be used on work having a large or larger diameter than the largest diameter of the tail-stock center. Smaller diameters may be turned accurately with this structure by first turning the diameter to the desired size far enough from the tail-stock end to accommodate the tool and rollers on the cut. By moving the lever 47 so as to shift the slides and rollers and tool to a work contacting position where the cut has already started, the cut may be picked up and continued accurately throughout the entire length of the work piece.

It should further be noted that the present lathe attachment is constructed so that it may be turned half-way around with the work still in it, so that the cut may be continued completely to the opposite end from which the cut was started. This may be accomplished by merely turning the work and the attachment end for end and reversing the rotation of the lathe.

The rollers 35, 36 and 37 may be formed as shown in detail in Figure 7, but preferably they are provided with a flat periphery such as indicated at 37ª.

As is shown in Figure 1 and in detail in Figure 9, the disc supporting plate 18 is provided with a vertically extending notch 65 at each lower corner of the plate 18. A bolt 66 is threaded into the front face of each support 11 and carries a spacing sleeve 67. These sleeves 67 fit into the vertical notches 65 at the corners of the plate 18 and permit upward and downward movement of the plate 18 after the bolts 53 have been loosened, thereby providing a floating action when the weight of the plate 18 is resting upon the springs 57. Each support 11 is provided with a suitable clamping screw 12 which tightens the jaw 13 in a set position upon the lathe saddle 10, as previously described. Each bolt 66 carries a guiding washer 68 which overlaps the adjacent notch 65 to act as a guide as the plate 18 moves upwardly and downwardly. The plate 18 will be guided between the front guiding washers 68 of the bolts 66 and the front faces of the supports 11 in its upward and downward floating action.

Having described the invention, what I claim as new is:

1. A precision turning lathe attachment comprising a support, a plurality of radially mounted work engaging pressure members adjustably mounted upon said support, an adjusting disc rotatably carried by said support, said disc having a plurality of cam guide-ways formed therein, means carried by said pressure members working in said guide-ways to adjust the pressure members radially of the support as said disc is rotated, an actuating lever pivotally mounted adjacent the disc, a plurality of spaced elements carried by said disc for engagement with said lever, and said lever having means for releasably and selectively engaging said elements.

2. A precision turning lathe attachment comprising a support, a plurality of radially mounted work engaging pressure members adjustably mounted upon said support, an adjusting disc rotatably carried by said support, said disc having a plurality of cam guide-ways formed therein, means carried by said pressure members working in said guide-ways to adjust the pressure members radially of the support as said disc is rotated, an actuating lever pivotally mounted adjacent the disc, said lever having means releasably engaging said disc for rotating the disc as said lever is swung, said last mentioned means comprising a plurality of spaced lugs carried near the periphery of said disc for engagement with said lever, and said lever having a fork-shaped end for releasably and selectively fitting over said lugs.

3. A precision turning lathe attachment comprising a support, a plurality of radially mounted work engaging pressure members adjustably mounted upon said support, an adjusting disc rotatably carried by said support, said disc having a plurality of cam guide-ways formed therein, means carried by said pressure members working in said guide-ways to adjust the pressure members radially of the support as said disc is rotated, an actuating lever pivotally mounted adjacent the disc, said lever having means releasably engaging said disc for rotating the disc as said lever is swung, said last mentioned means comprising a plurality of spaced lugs carried near the periphery of said disc for engagement with said lever, said lever having a fork-shaped end for releasably and selectively fitting over said lugs, and yieldable means supporting the lever at its pivot to facilitate the swinging of the lever into and out of selective engagement with said lugs to rotate said disc by a step-by-step engagement of the lever with said lugs.

4. A device of the class described comprising a support, a supporting plate vertically adjustable upon said support, spaced vertically extending bracer members carried by the support, a spacer carried by the plate, said bracer members having upper ends slidably mounted through said spacer to brace the upper end of said plate when said plate is vertically adjusted, a tool adjustably supported by the plate, work engaging pressure means adjustably carried by said plate, the tool and pressure means being radially mounted relative to the work to be engaged thereby, and means for simultaneously and uniformly adjusting the pressure means and tool toward and away from the work.

5. A device of the class described comprising a support, a supporting plate vertically adjustable upon said support, spaced vertically extending bracer members carried by the support, a spacer carried by the plate, said bracer members having upper ends slidably mounted through said spacer to brace the upper end of said plate when said plate is vertically adjusted, a tool adjustably supported by the plate, work engaging pressure means adjustably carried by said plate, the tool and pressure means being radially mounted relative to the work to be engaged thereby, means for simultaneously and uniformly adjusting the pressure means and tool toward and away from the work, and a gauge indicating the distance of movement of said tool and pressure means toward and away from the work.

6. A device of the class described comprising a support, a supporting plate vertically adjustably upon said support, spaced vertically extending bracer members carried by the support, a spacer carried by the plate, said bracer members having upper ends slidably mounted through said spacer to brace the upper end of said plate when said plate is vertically adjusted, a tool adjustably supported by the plate, work engaging pressure rollers adjustably carried by said plate, the tool and pressure rollers being radially mounted relative to the work to be engaged thereby, means for simultaneously and uniformly adjusting the pressure rollers and tool toward and away from the work, and a gauge indicating the distance of movement of said tool and pressure rollers toward and away from the work.

RAY J. LANINGHAM.

REFERENCES CITED

The following references are of record in the file of this patent:

UNITED STATES PATENTS

| Number | Name | Date |
|---|---|---|
| 288,854 | Potter | Nov. 20, 1883 |
| 805,539 | Gylfe | Nov. 28, 1905 |
| 1,228,570 | Kupp | June 5, 1917 |

FOREIGN PATENTS

| Number | Country | Date |
|---|---|---|
| 181,130 | Great Britain | June 12, 1922 |
| 474,393 | Great Britain | Nov. 1, 1937 |